United States Patent [19]
Valentine, deceased

[11] B 3,913,820

[45] Oct. 21, 1975

[54] WELDING MANIPULATOR

[75] Inventor: Lamar Travis Valentine, deceased, late of Houston, Tex., by Ruth Elaine Valentine, executrix

[73] Assignee: Welding Processes Company, Tulsa, Okla.

[22] Filed: Mar. 30, 1973

[21] Appl. No.: 346,585

[44] Published under the Trial Voluntary Protest Program on January 28, 1975 as document no. B 346,585.

[52] U.S. Cl. .................. 228/25; 228/45; 228/47
[51] Int. Cl.² ..................... B23K 5/00; B23K 5/02
[58] Field of Search ............ 228/25, 47, 48, 57, 45, 228/29; 29/200 P

[56] References Cited
UNITED STATES PATENTS

| | | |
|---|---|---|
| 1,782,461 | 11/1930 | Chapman .................. 228/48 X |
| 3,095,501 | 6/1963 | Goekler et al. .............. 228/45 X |
| 3,324,275 | 6/1967 | Peignen ..................... 228/29 X |
| 3,665,148 | 5/1972 | Yasenchak et al. .......... 228/45 X |

*Primary Examiner*—Andrew R. Juhasz
*Assistant Examiner*—R. J. Craig
*Attorney, Agent, or Firm*—Pravel & Wilson

[57] ABSTRACT

A welding manipulator used during welding of abutted ends of rotating lengths of pipe provides a quadridirectionally travelable boom to which is attached at one end thereof a welding head and a pipe engaging arm which communicates with one of the pipes whereby lateral displacement of the rotating lengths of pipe effects through the travel of the boom an identical displacement of the welding head thereby maintaining a constant spacing between the welding head and the welding surface.

7 Claims, 1 Drawing Figure

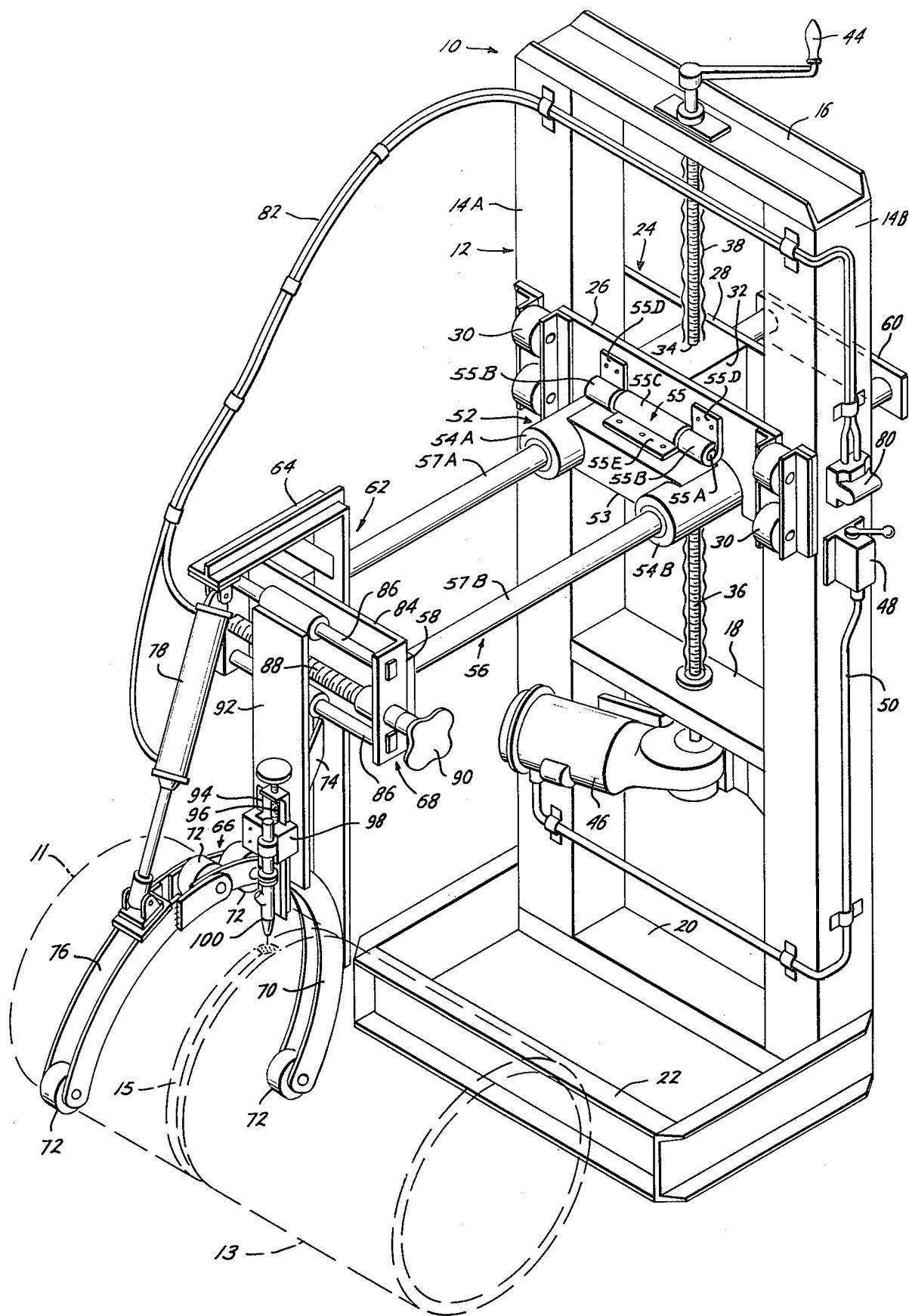

WELDING MANIPULATOR

BACKGROUND OF THE INVENTION

The field of this invention is welding manipulator apparatus.

In welding abutted lengths of pipe together the primary object is to achieve a weld which is at least equal to if not stronger than the lengths of pipe being welded.

Before welding the abutted ends of two lengths of pipe, especially when the pipes are of a large outer diameter, a common practice in the industry is to outwardly and inwardly bevel the respective ends of the pipes so that when abutted together they will present a V-shaped welding surface around the circumference of the pipes to receive weld metal from a welding head. During welding the lengths of pipe are slowly rotated and simultaneously therewith weld metal is introduced in layers into the weld surfacing, each succeeding layer building upon the previous one until the welding surface around the complete periphery thereof is filled with weld metal. In order to achieve the aforesaid primary object of welding, each layer of weld metal must be uniform in consistency and thickness throughout its entire annular length. To obtain this uniform weld metal layer consistency and thickness a constant spacing must be maintained between the welding surface and the welding head during welding. However, difficulty is encountered in keeping the spacing between the welding head and the welding surface constant since invariably the pipes are slightly "out of round" and hence when rotated are subjected to undulating lateral displacements whereas the welding head remains stationary. The resulting fluctuations in weld metal layer thickness and consistency produce a weak weld which is susceptible to renting.

It is an object of this invention to provide an apparatus for the manipulation of a welding head and abutted lengths of pipe during welding thereof.

It is another object of this invention to provide an apparatus for maintaining a constant spatiality between the welding head and the welding surface during welding of abutted lengths of revolving pipe.

It is a further object of this invention to provide an apparatus which will simultaneously with lateral displacement of the lengths of pipes being welded effect an identical displacement of the welding head.

SUMMARY OF THE INVENTION

Generally the invention consists of a boom which is travelable in a horizontal forwardly-rearwardly direction and which is also pivotal about a horizontal axis. Rigidly attached to one end of the boom is a welding head and a pipe engaging arm which extends forwardly therefrom to partially encircle abutted lengths of pipe. During rotation of the lengths of pipe while being welded, the pipe engagement arm follows any lateral displacement of the lengths of pipes and consequentially causes travel of the boom which effects a displacement of the welding head identical to that of the pipes thereby maintaining a constant spatiality between the welding head and the welding surface.

BRIEF DESCRIPTION OF THE DRAWING

The drawing shows a perspective view of the apparatus with the engaging means contacting one of the lengths of pipes which are to be welded together.

DESCRIPTION OF THE PREFERRED EMBODIMENT

During the description of the preferred embodiment of this invention, specific terminology will be used for the sake of clarity. However, it is to be understood that the language so used is not to be considered words of limitation and the words used include all technical equivalents which operate substantially in the same manner to accomplish substantially the same result.

Referring now to the drawing, the apparatus generally denoted by the numeral 10 is shown in operating position in proximity to two lengths of pipes 11 and 13 abutted together to present a welding surface 15. Pipe holders, not shown, support the pipes and have suitable means for imparting rotary movement thereto.

The apparatus 10 has a frame 12 consisting of two parallel rectangular upright members 14A and 14B fabricated from material such as steel tubing and connected by means of an upper brace 16, an intermediate brace 18, and a lower brace 20 extending between the upright members and joined thereto by means such as welding; the brace members are fabricated from material such as channel iron. Upright stability is attained by a base 22 which is welded to the bottom of the upright members and extends forwardly therefrom.

Slidably received on upright frame members 14A and 14B is a carriage 24 having a front member 26 and a rear member 28 which horizontally extend transversely across the upright members 14A and 14B and which members 26 and 28 have at each end roller bearings 30 in tangential contact with the respective front and back sides of the frame members 14A and 14B. The forward and rearward carriage plates 26, 28 are welded therefor otherwise connected to a block 32 disposed between the two upright members 14A and 14B and having therein a vertical threaded aperture 34.

Rotatably received in collars on top brace 16 and intermediate brace 18 and extending therebetween and beyond, parallel with the upright members 14A and 14B of the frame, is a thread screw 36 having thereon square or other suitable threads which engage the threads in the threaded aperture 34 of the carriage block 32. Flexible boots 38 made of material such as rubber or pliant plastic may be sleeved over the thread screw 36 on either side of the carriage block 32 for protection of the threads 36. Journaled on the upper end of the thread screw 36 for facilitating manual rotation thereof is a crank 44, but it will be appreciated that power means may be used for such rotation. A reversing electric motor 46 is interconnected to the lower end of thread screw 36 by an integral speed reducer and is actuated by a three-position electrical switch 48 communicating with the motor through electrical conduit 50.

Two tubular cylinders 54A and 54B in horizontal tandem spaced relationship and connected together by cross bracing 53 form a boom housing 52 which is axially perpendicular to carriage 24 and attached thereto in a pivotal relationship by a hinge 55 for pivoting the carriage 24 about a horizontal axis through hinge pin 55A. The hinge pin 55A extends through end sleeves 55B and an intermediate sleeve 55C. The end sleeves 55B have hinge plates 55D secured thereto and to the member 26, while the sleeve 55C has a hinge plate 55E secured thereto and to the cross bracing 53. The cylinders 54A and 54B extend through but are not connected to notches in the plate 26, so that the cylinders 54A, 54B and the parts connected therewith may pivot about the pivot pin 55A relative to the plate 26 and the parts such as the block 32 secured thereto. Although not shown in the drawings, a plurality of straight journal bearing units are circumferentially disposed in the inner diameter of each of the tubular cylinders 54A and 54B in a manner well known in the art.

Passing through the tubular cylinders 54A and 54B and projecting forwardly and rearwardly therefrom are the shafts 57A and 57B of a boom 56. The journal bearings within the tubular cylinders present a substantially frictionlessly gliding surface for forward and rearward travel of boom shafts 54A and 54B therewithin. The shafts of the boom are connected at each end by yokes 58 and 60.

At the forward end of the boom 56 is a welding head positioning assembly 62 which includes a pipe engaging means 66 and a welding head receptacle 68 both of which are secured to an inverted L-shaped attachment bar 64 which is in turn perpendicularly secured to yoke 58.

In one embodiment, the pipe engaging means 66 includes a stationary portion 70 which is shaped to substantially conform to the outer curvature of the pipe and which extends forwardly from the inverted L-shape attachment bar 64 to which it is attached, preferably by being welded directly thereto at one point and interconnected at a second point by means of a strut 74. Rotatably received in both ends of stationary arm portions 70 are roller wheels 72. Pivotally attached to the upper part of the stationary portion 70, preferably with the axle of one of the wheels 72, is a movable portion 76 which is also shaped to conform substantially to the outer curvature of the pipe and which also has at the opposite end of the point of pivotal attachment to the stationary portion 66 another roller wheel 72. Pivotal movement of the movable portion 72 is governed by an air cylinder 78 having one end attached to the horizontal portion of the inverted L-shaped attachment bar 64 and having the plunger thereof pivotally connected to the movable arm portion 76. An air switch 80 fastened to the upright member 14B of the frame 12 and communicating with the air cylinder through an air conduit 82 actuates the air cylinder 78. The portions 70 and 76 of the pipe engaging means may be integral and both may be fixed to the support 74 or similar support, in which case, the air cylinder 78 is omitted.

Turning now to the welding head receptacle 68 and the integral parts thereof, it is to be appreciated that the receptacle incorporates means for both left-right horizontal and vertical mobility of a welding head 100 clamped thereto. Horizontal left-right mobility is accomplished by a framework 84 which is horizontally fastened to the vertical portion of attachment bar 64 and which supports smooth shafts 86 and rotatably supports thread shaft 88 which has thereon a knob 90 to cause the rotation. A housing 92 is slidably received on shafts 86 and includes a perforated nut portion having female threads which engage thread shaft 88 for effecting sliding movement of the housing. Vertical mobility of a welding head is provided by a framework 94, which is vertically secured to housing 92 and which rotatably supports a thread shaft 96. A slide 98 to which is clamped a welding head 100 threadably engages shaft 96 and is dovetailed to the longitudinal edges of framework 94 for sliding movement thereabout thereby varying the vertical position of the welding head 100.

The welding head 100 shown is of the type utilizing a continuous wire feed; however, the apparatus will just as easily accept any of the other types of welding heads. Furthermore, other mechanisms used in conjunction with a welding head such as a welding head oscillator could also be attached to slide 98.

In operation, the lengths of pipe to be welded are usually approximately forty feet in length and are supported on conventional pipe rollers or handlers which have means for revolving or rotating the pipes about their longitudinal axis. In order to assure common rotation of the two lengths of pipe, the ends are initially tack welded at various spots around the periphery thereof.

The apparatus 10 is positioned beside the lengths of pipe in the area adjacent to welding surface 15. Through rotation of adjusting screw 36 by either the manual crank 44 or by actuation of the motor 46 the carriage 24 is given vertical movement in the proper direction to enable the pipe engaging means 66 to partially encircle one of the lengths of the pipe in proximity to the welding surface 15 to be welded. Through manipulation of the threaded shafts 88 and 96, or other suitable adjusting means, the welding head 100 is positioned directly over the welding surface 15 at the correct vertical spacing or distance from the welding surface 15 to achieve maximum strength and otherwise obtain a satisfactory annular weld.

While the lengths of pipes are slowly rotated during welding thereof, any lateral displacement of the pipes caused by the pipes being laterally shifted during rotation by the rotating support rolls, or the pipe engaged by the means 66 being out of round or having variations in the external configuration thereof for any other reason, will be transmitted to the boom 56 by the pipe engaging means 66, thereby causing the boom 56 to move in one or more different directions, separately or simultaneously, resulting in travel of the boom 56 and the parts movable therewith in one or more horizontal, forward-rearward, and vertical directions and consequently resulting in a displacement of the welding head 100 vectorially identical to that of the pipe engaging means 66. For example, the pipes may cause the means 66 to move upwardly, resulting in a pivoting of the boom housing 52 and the boom 56 therewith about the pivot or hinge 55 relative to the frame 12. Also, the means 66 may be moved rearwardly towards the frame 12, or forwardly away from the frame 12, by a sliding movement of the shafts 57A, 57B in their respective cylinders 54A, 54B. Thus, the welding head 100 is moved in synchronism exactly as the pipe engaging means 66 is moved so that the space or distance of the welding head 100 from the welding surface 15 will remain constant and the weld metal flowing from the welding head will be deposited in the welding surface in a layer of uniform thickness and consistency around the periphery thereof. Each succeeding annular layer of weld metal will build upon the previous layer until weld metal fills the welding surface thereby achieving a weld of maximum strength. When the weld is completed the apparatus 10 is removed from the pipe by operating the crank 44 to raise the carriage 24, as is believed evident from the foregoing description.

The foregoing disclosure and description of the invention are illustrative and explanatory thereof, and various changes in the size, shape, and materials as well as in the details of the illustrated construction may be made without departing from the spirit of the invention.

It is claimed:

1. Welding manipulator apparatus for use in the welding of abutted ends of two lengths of pipe while they are revolved about their longitudinal axis, comprising:

a frame having spaced apart upright members;

a carriage on said upright members of said frame;

a boom housing mounted with said carriage, said boom housing comprising horizontal cylinder means positioned transversely to said carriage;

pivotal mounting means pivotally connecting said boom housing horizontal cylinder means to said carriage for pivotal movement of said boom housing horizontal cylinder means relative to said frame;

a boom slidably supported in said boom housing horizontal cylinder means and projecting therefrom for movement in forward and rearward directions relative to said frame;

a welding head mounted with said boom forwardly of said frame for positioning adjacent to a welding surface and for movements with said boom; and pipe engaging means mounted with said boom forwardly of said frame for engagement with at least one length of pipe in proximity to the welding surface to be welded for movements in response to variations in the external configuration of the pipe, whereby movements of said pipe engaging means are transmitted to said boom for causing corresponding movements of said welding head.

2. The apparatus of claim 1, wherein:

said boom housing horizontal cylinder means comprises two substantially horizontally tandem spaced tubular cylinders connected by cross bracing and positioned substantially perpendicular to said carriage and pivotably attached to said carriage by said pivotal mounting means; and said boom includes shafts slidably supported in said tubular cylinders of said boom housing horizontal cylinder means and projecting therefrom in forward and rearward directions.

3. The apparatus of claim 1, wherein:

said carriage includes roller wheels in rotatable contact with the upright members of said frame and a block portion having a vertical threaded aperture therethrough; and said carriage is vertically slidable on the upright members of said frame by means of a thread screw rotatably supported on said frame intermediate said upright members and threadably engaged in said vertical aperture of said block portion of said carriage.

4. The apparatus of claim 1, including:

means for moving said carriage and said boom therewith substantially vertically for initially positioning said pipe engaging means in contact with the surface of the pipe.

5. The apparatus of claim 1, wherein said pipe engaging means includes:

an arcuate arm having a pair of circularly spaced contact rollers for contact with the pipe.

6. The apparatus of claim 5, including:

a movable arm pivotally connected to said arcuate arm and having a roller therewith for contact with the pipe.

7. The apparatus of claim 6, including:

means for pivoting said movable arm relative to said arcuate arm for adjusting the size of the opening therebetween to contact all of said rollers with the pipe.

* * * * *